United States Patent [19]

Chamzas et al.

[11] Patent Number: 5,031,053
[45] Date of Patent: Jul. 9, 1991

[54] EFFICIENT ENCODING/DECODING IN THE DECOMPOSITION AND RECOMPOSITION OF A HIGH RESOLUTION IMAGE UTILIZING PIXEL CLUSTERS

[75] Inventors: Christodoulos Chamzas, West Long Beach; Donald L. Duttweiler, Rumson, both of N.J.

[73] Assignee: AT&T Bell Laboratories, Murray Hill, N.J.

[21] Appl. No.: 359,910

[22] Filed: Jun. 1, 1989

[51] Int. Cl.$^5$ ............................................. H04N 1/415
[52] U.S. Cl. ..................................... 358/426; 358/433; 358/133; 358/447
[58] Field of Search ............... 358/261.1, 261.2, 261.3, 358/261.4, 426, 133, 443, 447, 464, 467, 453; 382/44, 47

[56] References Cited

U.S. PATENT DOCUMENTS

| | | | |
|---|---|---|---|
| 4,261,018 | 4/1981 | Knowlton | 358/426 |
| 4,356,555 | 10/1982 | Ejiri et al. | 364/515 |
| 4,360,883 | 11/1982 | Ejiri et al. | 364/515 |
| 4,365,273 | 12/1982 | Yamada et al. | 358/260 |
| 4,366,506 | 12/1982 | Ejiri et al. | 358/260 |
| 4,870,497 | 9/1989 | Chamzas et al. | 358/426 |
| 4,873,577 | 10/1989 | Chamzas | 358/426 |

OTHER PUBLICATIONS

C. Chamzas et al., "PED: Progressive Edge Decomposition of Facsimile Images", ISO/SC2/WG8 and CCITT SG VIII, Doc. No. JBIG-N32, Sep. 15 1988.
R. B. Arps et al., "Progressive Adaptive Bi-Level Image Compression (PBIC) Proposal", ISO-/IEC/JTC1/SC2/WG8 JB1G No. 33, Rev. 4, Jan. 25, 1989.
BIS, Japan, "Progressive Coding Method for Bi-Level Images", ISO/JTC1/SC2/WG8 and CCITT SG VIII JB1G N-75, Jan. 1989.
"Facsimile Coding Schemes and Coding Control Functions for Group 4 Facsimile Apparatus", International Telephone and Telegraph Consultative Committee (CCITT), Redbook, Fascicle VII, 3, Rec. T.6 1984, pp. 40-48.

Primary Examiner—Joseph A. Orsino
Assistant Examiner—Thomas D. Lee
Attorney, Agent, or Firm—Thomas Stafford

[57] ABSTRACT

More efficent encoding/decoding in decomposing and recomposing a high resolution image is obtained by employing a unique pixel cluster arrangement. The pixel clusters of an image are classified as one of a plurality of classifications. A unique encoding/decoding technique is assigned to each classification. In one embodiment, a cluster including at least one high resolution pixel to be recomposed from a corresponding low resolution pixel which is a so-called exception to general prediction rules is classified as a first classification. A cluster including no pixels which are exceptions is classified as a second classification. Supplemental information is encoded/decoded for all pixels in a cluster classified as the first classification. Pixels in the cluster classified as the second classification are encoded/decoded according to the general prediction rules.

23 Claims, 14 Drawing Sheets

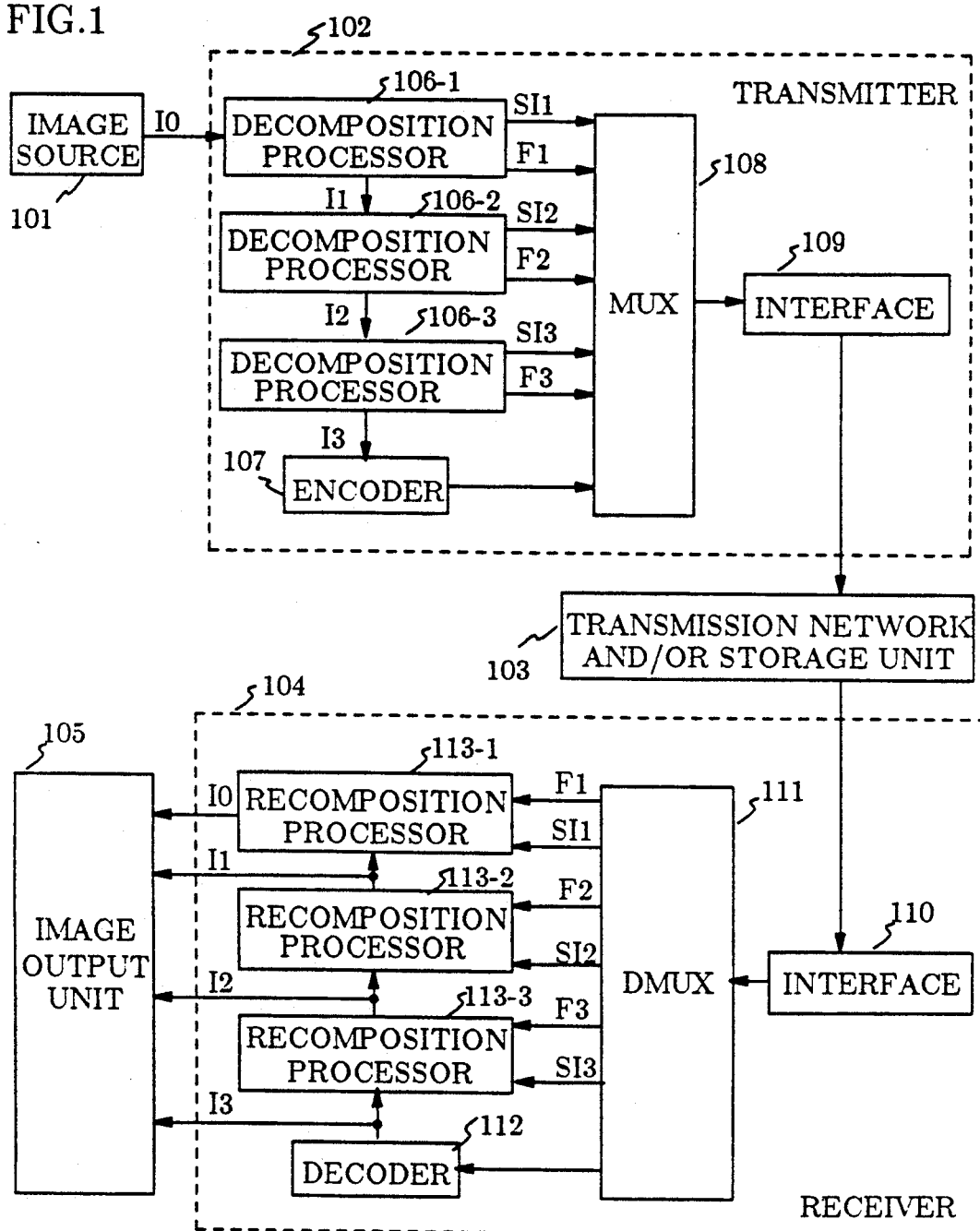

| GROUP ASSIGNMENT | SUPER PIXEL ASSIGNMENT |
|---|---|
| $U = L1(k-1, \ell-1)$<br>$A = L1(k-1, \ell)$<br>$D = L1(k-1, \ell+1)$<br>$P = L1(k, \ell-1)$<br>$S = L1(k, \ell)$<br>$N = L1(k, \ell+1)$<br>$K = L1(k+1, \ell-1)$<br>$B = L1(k+1, \ell)$<br>$L = L1(k+1, \ell+1)$ | $s1 = h0(m, n)$<br>$s2 = h0(m, n+1)$<br>$s3 = h0(m+1, n)$<br>$s4 = h0(m+1, n+1)$ |

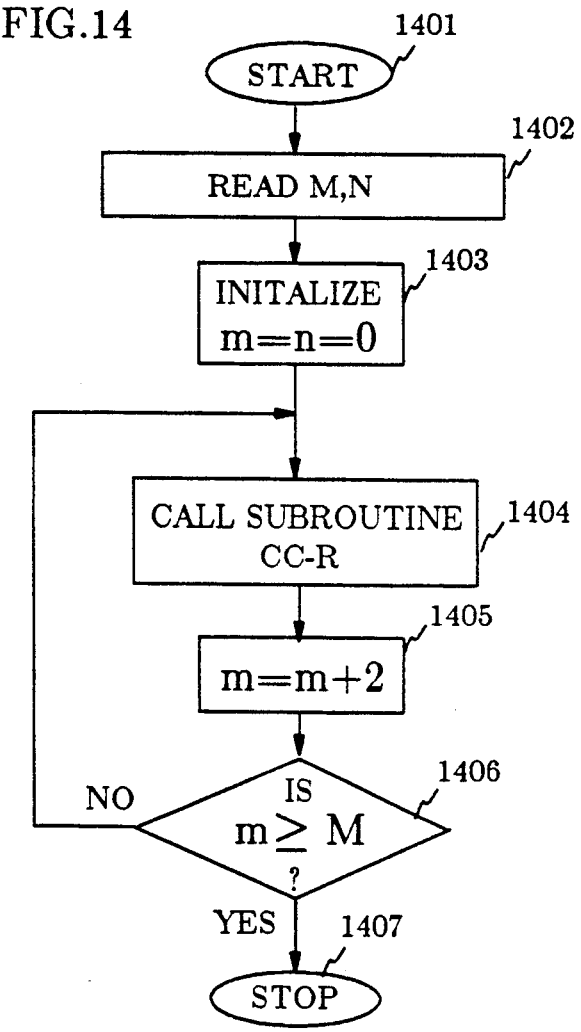

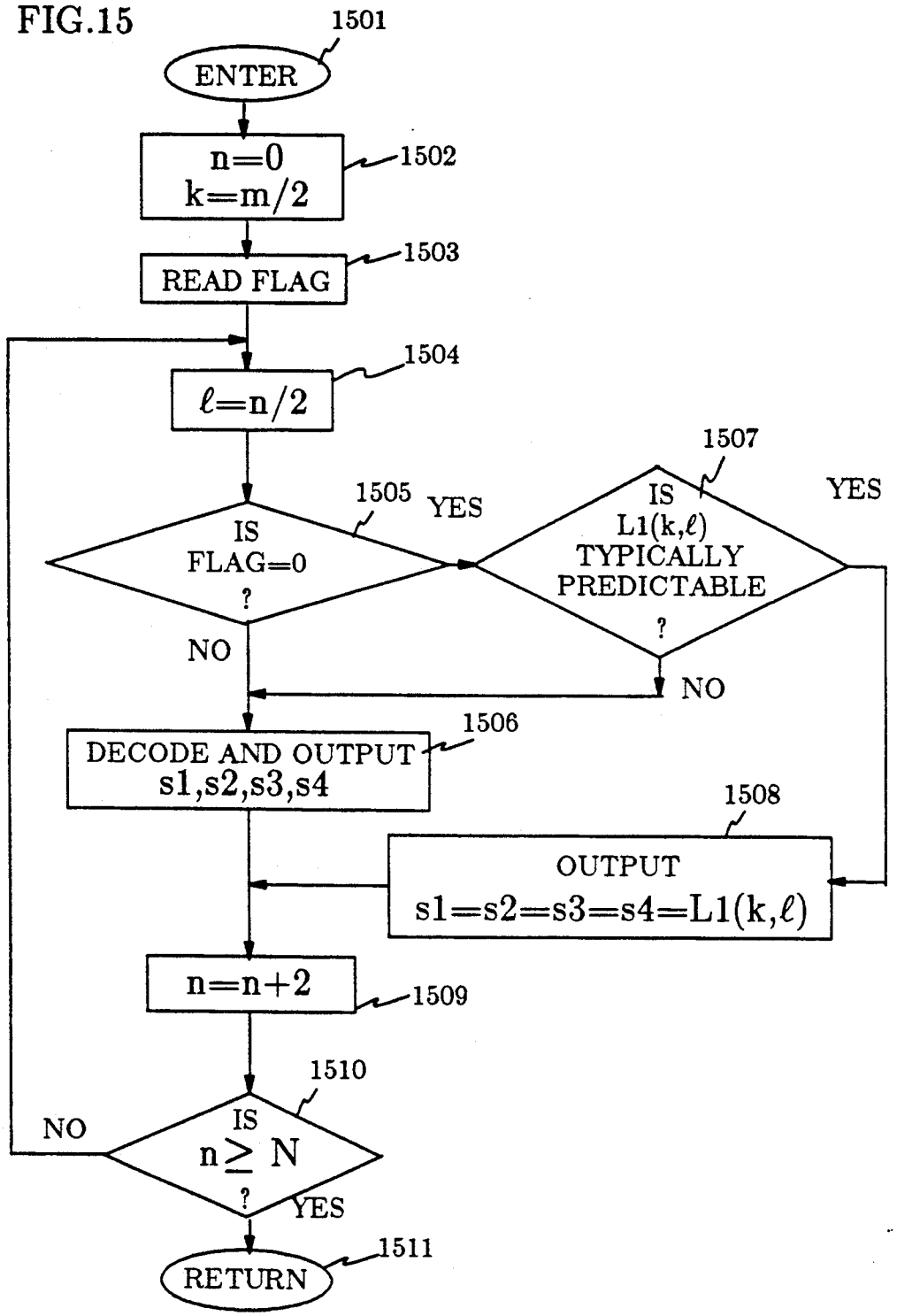

EFFICIENT ENCODING/DECODING IN THE DECOMPOSITION AND RECOMPOSITION OF A HIGH RESOLUTION IMAGE UTILIZING PIXEL CLUSTERS

CROSS-REFERENCE TO RELATED APPLICATION

U.S. patent application Ser. No. 359,909 was filed concurrently herewith.

TECHNICAL FIELD

This invention relates to transmission and/or storage of images and, more particularly, to efficient encoding/decoding of image information.

BACKGROUND OF THE INVENTION

Recently, there has been a rapid increase in the transmission and/or storage of image information and the like. This has been especially true in the use of facsimile. Additionally, use of high resolution monitors for generating a soft copy and/or browsing of the image information has resulted in additional requirements being placed on digital transmission and/or storage interfaces. In certain applications, rapid progression from a low resolution replica to a high resolution image is desirable and sometimes necessary. In order to improve encoding/decoding efficiency and speed, prior arrangements were employed which decomposed a high resolution image into a lower resolution replica and so-called supplemental information. The supplemental information was required to later recompose the low resolution replica into the high resolution image. In one known prior arrangement, supplemental information was generated only for pixels (picture elements) determined to be in a predetermined relation with their neighboring pixels, i.e., at an edge. Pixels that no not satisfy the above condition but that were determined to require supplemental information were forced to satisfy the above condition by modifying the image reduction rules. That is, the reduction rules were modified to force a pixel to satisfy the above condition whenever the prediction rules would cause a decoder to otherwise improperly recompose the high resolution image. See, for example, our co-pending U.S. patent application Ser. No. 146,998, filed Jan. 22, 1988 now U.S. Pat. No. 4,870,497 issued Sept. 26, 1989 for one such prior arrangement.

A serious limitation of such a prior arrangement is that the prediction rules used to determine if supplemental information was required to be generated and encoded were based and dependent on the particular properties of the image reduction rules. Therefore, if the image reduction rules were changed, the prior prediction rules could not be used. Thus, any change in the image reduction rules would require development of a new set of prediction rules. This interdependence of the image reduction rules and the prediction rules is undesirable.

More recently, as disclosed in our co-pending U.S. patent application Ser. No. 359,909, filed concurrently herewith, the interdependence between the reduction rules and the prediction rules was eliminated. This is achieved by employing so-called general prediction rules to determine if the pixels to be recomposed are so-called typically predictable or non-typically predictable. Typically predictable pixels which would be improperly recomposed by using the general prediction rules are identified as exceptions. The non-typically predictable pixels and the typically predictable pixels that are exceptions require supplemental information to properly be recomposed. An exception was required to accompany each pixel identified as an exception. This, in turn, required the encoding and, subsequent, decoding of the exceptions. This encoding and decoding caused complexity and was inefficient. Thus, although the arrangement disclosed in our co-pending U.S. patent application Ser. No. 359,909, cited above, operates satisfactorily in many applications, its complexity and inefficiency renders it undesirable for other applications.

SUMMARY OF THE INVENTION

The limitations and other problems of the prior known prediction arrangements used in image decomposition and recomposition are overcome, in accordance with an aspect of the invention, by grouping a number of pixels into so-called clusters and by classifying each cluster as having one of a plurality of classifications.

In one embodiment employing two classes of clusters, a cluster including at least one so-called typically predictable pixel identified as an exception to the general prediction rules is classified as having a first classification and is identified as such by an accompanying first classification flag. A cluster including typically predictable pixels with no exception and/or non-typically pixels is classified as having a second classification flag. Supplemental information is generated for all pixels in clusters having the first classification. Otherwise, supplemental information is only generated for non-typically predictable pixels.

In recomposing a 'high" resolution image, the high resolution pixels are recomposed, in accordance with an aspect of the invention, by employing the classification flags of the clusters. If a cluster has the first classification flag, all of the high resolution pixels are recomposed from the accompanying supplemental information. If a cluster has the second classification flag, the high resolution pixels are recomposed in accordance with the general prediction rules and if they are non-typically predictable pixels, from the accompanying supplemental information.

BRIEF DESCRIPTION OF THE DRAWING

In the Drawing:

FIG. 1 shows, in simplified block diagram form, details of a progressive image transmission and/or storage system which advantageously employs aspects of the invention;

FIG. 14 is a flow chart illustrating operation, in accordance with an aspect of the invention, of an embodiment of the recomposition processor of FIG. 11; and FIG. 15 is a flow chart of subroutine CC-R used in the operation of the illustrative embodiment of the recomposition processor illustrated in the flow chart of FIG. 14 which, in accordance with an aspect of the invention, recomposes pixels in the clusters.

DETAILED DESCRIPTION

Figure 2A:
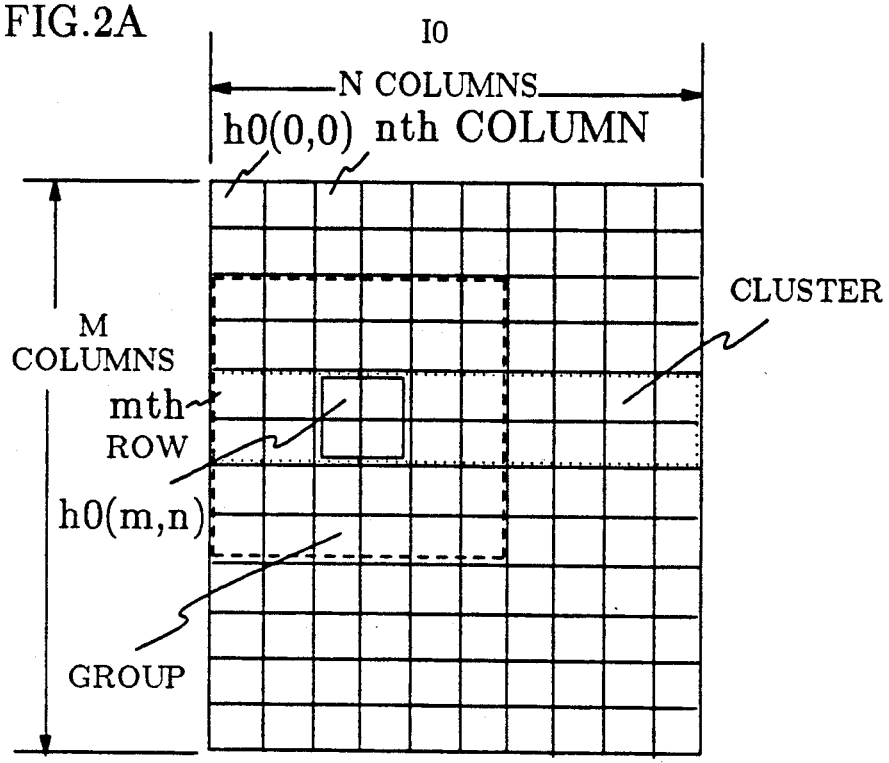
FIGS. 2A and 2B depict in graphic form a high resolution image and a corresponding low resolution replica, respectively, useful in describing embodiments of the invention.

FIG. 1 shows, in simplified block diagram form, details of a progressive image transmission and/or storage system which advantageously employs aspects of the invention. Accordingly, shown are image source 101, transmitter 102, transmission network and/or storage unit 103, receiver 104 and image output unit 105.

Image source 101 provides, in this example, a desired high resolution image and may be, for example, either a scanner or a data base. One such scanner which may advantageously be employed is manufactured by Cannon and is designated laser copier scanner NP-9030. The images to be transmitted may also be stored in a data base on, for example, either a magnetic disc or an optical disc. In this example, not to be construed as limiting the scope of the invention, the high resolution image I0 includes 400 dots per inch and has $M_0$ columns and $N_0$ rows and includes $M_0 \times N_0$ pixels, as shown in FIG. 2A. A so-called super pixel in high resolution image I0 includes a block of "high" resolution pixels. Although any desired number of high resolution pixels from a plurality of columns and rows may be grouped to form a super pixel, in this example, it has been convenient to group four (4) high resolution pixels into a super pixel. Thus, in this example, a super pixel includes a block of four high resolution pixels, namely, h0(m,n), h0(m,n+1), h0(m+1,n) and h0(m+1,n+1), where m and n are the row and column indices, respectively in the original high resolution image. In this example, when the Cannon scanner is employed to scan the original image, at 400 dots per inch, it yields $M_0 = 3456$ columns and $N_0 = 4672$ lines for an A4 standard size document.

Figure 2B:
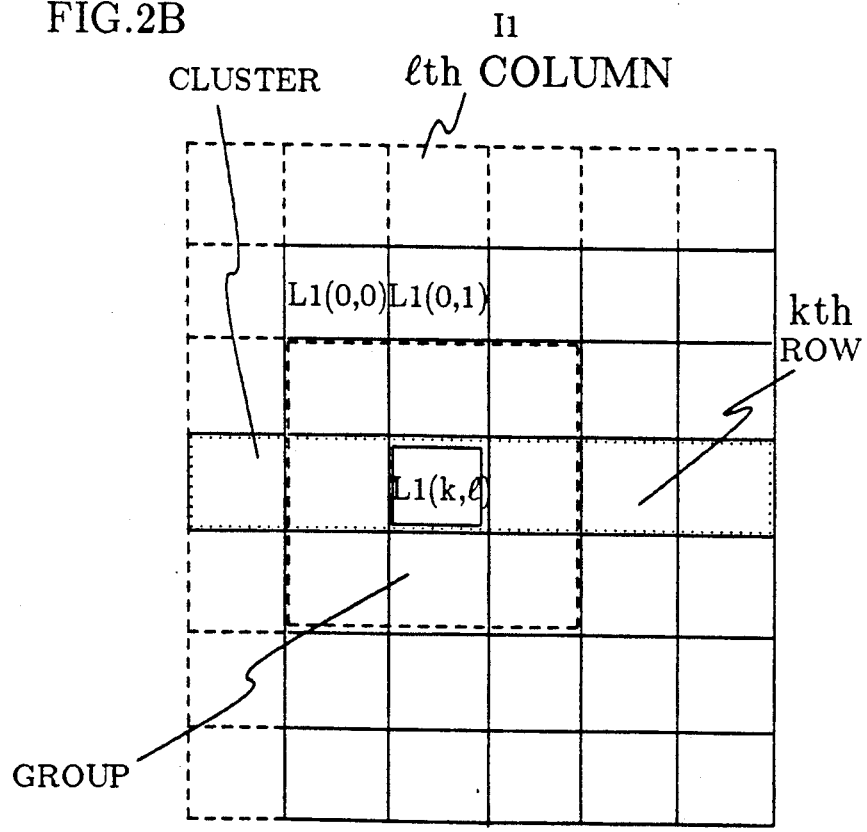

Shown in FIG. 2A and 2B are clusters of pixels and a grouping of pixels employed to determine if pixels are typically predictable or non-typically predictable. In this example, not to be construed as limiting the scope of the invention, the clusters comprise a number of rows of pixels in the high resolution image and a corresponding appropriate number of rows of pixels in the low resolution replica. It will be apparent that other cluster configurations could also be used in practicing aspects of the invention.

The high resolution pixels are supplied from image source 101 to transmitter 102 and, therein, to decomposition processor 106-1. Decomposition processor 106-1 operates, as described below, to generate a low resolution replica I1 of the high resolution image, also shown in FIG. 2B. Thus, the high resolution image I0 is decomposed into low resolution replica I1 having $M_1$ rows and $N_1$ columns plus supplemental information SI1 and classification flag F1. In this example, $M_1 = M_0/2$, $N_1 = M_0/2$ and the resolution of low resolution replica I1 is 200 dots/inch. As shown in FIG. 2B, low resolution replica I1 has an imaginary reference column of pixels to the left of column 1 = 0 and an imaginary reference row of pixels above row k = 0, where l and k are the column and row indices, respectively. In this example, the pixels in the imaginary reference column and row are chosen to be white. The decomposition from high resolution image I0 to low resolution replica I1 is realized by replacing every super pixel including high resolution pixels h0(m,n), h0(m+1,n), h0(m,n+1) and h0(m+1,n+1) in image I0 with a single low resolution pixel L1(k,l). The difference between the original high resolution image I0 and the low resolution replica I1 is the supplemental information SI1 required to upgrade the lower resolution replica into a higher resolution image. It should be noted that the supplemental information for low resolution pixels is generated, in accordance with an aspect of the invention, for all low resolution pixels in a cluster classified as being in the first classification and for non-typically predictable pixels in a cluster classified as being in the second classification. Generation of the supplemental information is described below with respect to the decomposition process.

Transmitter 102 includes a number of decomposition processors, in this example, decomposition processors 106-1, 106-2 and 106-3. Although three decomposition processors are shown, in this example, it will be apparent that any desired number may be employed depending on the particular application. Indeed, a single decomposition process 106-1 could be employed, if desired. Each of decomposition process 106-1 through 106-3 decomposes a "high" resolution image into a "low" resolution replica. As described above, FIGS. 2A and 2B the relationship between the high resolution image I0 and the low resolution replica I1 generated by decomposition processor 106-1. The "high" resolution image supplied to decomposition processor 106-2 is low resolution replica I1 from decomposition processor 106-1. In turn, decomposition processor 106-2 generates low resolution replica I2 which, in turn, is supplied to decomposition processor 106-3 as its "high" resolution image. Decomposition processor 106-3 generates a so-called basic low resolution replica I3. The relationship between the pixels in each "high" resolution image and "low" resolution replica is identical to the relationship between pixels in I0 and I1 as shown in FIGS. 2A and 2B and described above. That is, in this example, there is a 2 to 1 reduction in dots/inch and a 4 to 1 reduction in pixels for each decomposition generated by decomposition processors 106-1 through 106-3. Thus, the resolution of the basic low resolution replica I3, in this example, generated by decomposition processor 106-3 is 50 dots/inch.

The pixels L3(l,k) of the basic low resolution replica I3 are supplied to encoder 107. Encoder 107 encodes the pixels L3(l,k) in well-known fashion. Specifically, any one of several known CCITT or other standard encoding techniques may be employed. One CCITT encoding technique is described in *INTERNATIONAL TELEPHONE AND TELEGRAPH CONSULTATIVE COMMITTEE (CCITT)*, "Facsimile Coding Schemes and Coding Control Functions for Group IV Facsimile Apparatus", Redbook, Facsimile VII.3, Rec. T.6, 1984, pages 40–48. Another encoder that may be employed is described in a co-pending U.S. patent application Ser. No. 359,559, filed concurrently herewith. The encoded pixel information is supplied to multiplexer (MUX) 108. Also, supplied to MUX 108 are encoded supplemental information and encoded classification flags from each of decomposition processors 106-1, 106-2 and 106-3, namely, encoded supplemental information SI1, SI2 and SI3, respectively, and encoded classification flags F1, F2 and F3, respectively. MUX 108 combines the encoded basic pixel information, the encoded supplemental information and the encoded classification flags, in well known fashion, for transmission and/or storage. To this end, it is noted that for transmission applications the encoded supplemental information SI1, SI2 and SI3 and the encoded classification flags, F1, F2 and F3 are multiplexed in reverse sequential order. This is necessary because the lower resolution supplemental information and the classification flags, namely, SI3 and F3, in this example, are required first in recomposing to the original high resolution image.

The multiplexed signal is supplied to interface 109 which interfaces to transmission network and/or storage unit 103. The configuration of interface 109 is dependent on the particular transmission network and/or storage unit being employed. Such arrangements are known in the art.

The encoded image information is transmitted via a transmission network or obtained as desired from a storage unit and supplied to receiver 104 and therein via an appropriate interface 110 to demultiplexer (DMUX) 111. DMUX 111 demultiplexes, in well known fashion, the encoded basic low resolution pixel information, the encoded supplemental information and the encoded classification flags. The encoded basic low resolution pixel information is supplied to decoder 112, which decodes it in known fashion. Decoder 112 must be compatible with encoder 107 and one such decoder is described in the article entitled "Facsimile Coding Schemes and Coding Control Functions for Group IV Facsimile Apparatus", cited above. Another such decoder is described in U.S. patent application Ser. No. 359,559, also cited above. The decoded pixel information for I3 is supplied to recomposition processor 113-3 and to image output unit 105. Also supplied to recomposition processor 113-3 are the encoded supplemental information SI3 and encoded classification flag F3. Recomposition processor 113-3 is responsive to the basic low resolution pixel information for I3, the supplementary information SI3 and classification flag F3 to recompose a "high" resolution image I2. The relationship of low resolution replica I3 to "high" resolution image I2 is identical, to I0 and I1, as shown in FIGS. 2A and 2B and described above. Pixels of the recomposed "high" resolution image I2 are supplied to image output unit 105 and to recomposition processor 113-2. Also supplied to recomposition processor 113-2 are the encoded supplemental information SI2 and classification flag F2. Recomposition processor 113-2 is responsive to the supplied low resolution pixel information for I2, supplemental information SI2 and classification flag F2 to generate pixels forming "high" resolution image I1, in a manner identical to that employed in recomposition processor 113-3. The pixel information for image I1 is supplied to image output unit 105 and to recomposition processor 113-1. Again, also supplied to recomposition processor 113-1 are encoded supplemental information SI1 and the encoded classification flag F1. Recomposition processor 113-1 is responsive to the supplied pixel information for I1, supplemental information SI1 and classification flag F1 to generate pixels forming the original high resolution image I0. The structure and operation of recomposition processor 113-1 and is identical to recomposition processors 113-2 and 113-3 and is described below. Pixels forming image I0 are supplied to image output unit 105.

Since pixel information for each of images I0, I1, I2 and I3 is supplied to image output unit 105, any one of the resolution levels can be selected, as desired, and the recomposition process can be stopped when an acceptable or desired resolution has been obtained.

Figure 3:
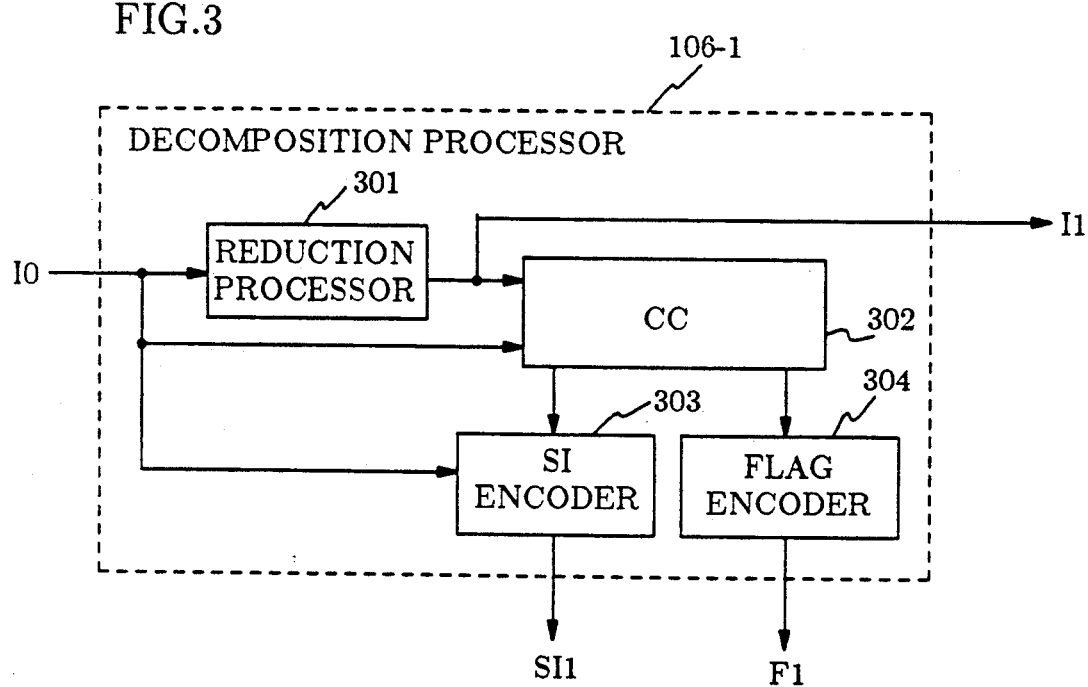
FIG. 3 shows, in simplified block diagram form, details of one of the decomposition processors employed in the embodiment of FIG. 1.

FIG. 3 shows, in simplified block diagram form, details of decomposition processor 106-1. Since the operation and structure of each of decomposition processors 106-1 through 106-3 is identical only decomposition processor 106-1 will be described in detail. Accordingly, decomposition processor 106-1 includes reduction processor 301, cluster classifier (CC) 302, supplemental information (SI) encoder 303 and classification flag encoder 304. High resolution pixels from an image, in this example I0, are supplied to reduction processor 301, CC 302 and SI encoder 303. Reduction processor 301 yields low resolution pixels L1(k,l) of low resolution replica I1 from the supplied high resolution pixels. To this end, reduction processor 301 may employ any desired set of reduction rules. One possible set of reduction rules which may be employed are those described in a document entitled "Progressive coding method for bi-level images", submitted to the Joint Bi-level Image Group and identified as ISO/JTC1/SC2/WG8, Document N-75, Dated January 1989. SI encoder 303 and flag encoder 304 may be any of known encoders. Preferably, the encoders are of the arithmetic type which are known in the art. One such arithmetic encoder is described in the U.S. patent application Ser. No. 359,559, cited above.

CC 302 is employed, in accordance with an aspect of the invention, to classify the clusters of pixels as being one of a plurality of classifications. In this example, not to be construed as limiting the scope of the invention, each cluster is classified as being in either a first classification or a second classification. The first classification is defined as a cluster having at least one pixel that is typically predictable and is an exception to the general prediction rules. The second classification is defined as a cluster including typically predictable pixels with no exceptions and/or non-typically predictable pixels. Flag encoder 304 generates an appropriate classification flag F1 indicating the classification of the corresponding cluster. In this example, classification flag F1 being a logical "1" indicates the first classification and classification flag F1 being a logical "0" indicates the second classification. CC 302 generates a signal for enabling SI encoder 303 to encode the corresponding supplemental information for all pixels in a cluster classified as the first classification and for non-typically predictable pixels in a cluster classified as the second classification. The supplemental information to be encoded includes, in this example, the colors of the high resolution pixels s1, s2, s3 and s4.

Figures 4, 5:
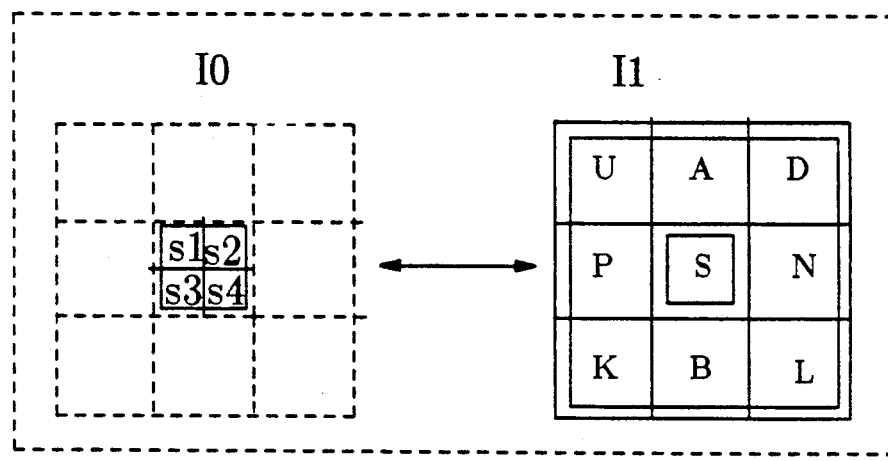
FIG. 4 is a graphical representation of portions of a high resolution image and a low resolution replica useful in describing aspects of the invention.
FIG. 5 is a table depicting a so-called group pixel assignment and super pixel assignment useful describing an embodiment of the invention.

The prediction rules employed in this embodiment include the use of a first group of pixels, in conjunction with a current low resolution pixel L1(k,l), to determine if the corresponding high resolution pixels to be recomposed are typically predictable, non-typically predictable or typically predictable which are exceptions to the general prediction rules. The group of pixels assigned, in this example, is graphically illustrated in FIG. 4. The row and column locations of the pixels of the assigned group in the low resolution replica and the super pixel assignments in the high resolution image are shown in FIG. 5. Thus, in low resolution replica I1 the group includes low resolution pixels labeled U, A, D, P, N, K, B and L surrounding the current low resolution pixel L1(k,l) labeled S. In high resolution image I0 the pixels are, in this example, the high resolution pixels forming the high resolution super pixel being decomposed into the current low resolution pixel labeled S, namely, s1, s2, s3 and s4.

The prediction rules are as follows:

(a) High resolution pixels to be recomposed from the current low resolution pixel labeled S are typically predictable and not an exception, if U=A=D=P=S=N=K=B=L and s1=s2=s3=s4=S.

(b) High resolution pixels to be recomposed from the current low resolution pixel S are typically predictable and an exception, if U=A=D=P=S=N=K=B=L and the color of any of s1, s2, s3 or s4 is not the same as S.

(c) High resolution pixels to be recomposed from the current low resolution pixel S in conjunction with the general prediction rules are non-typically predictable, if the color of any of U, A, D, P, N, K, B or L is not the same as S.

In this example, the color of the high and low resolution pixels is assumed to be either white represented by a logical "0" or black represented by a logical "1". It will be apparent that any other desired colors could equally be employed. Additionally, all the high resolution pixels are available, in this example, from an image source 101 and all the low resolution pixels are available from reduction processor 301. For subsequent ones of decomposition processors 106, the high resolution pixels are available from the prior one of decomposition processors 106.

Figure 6:
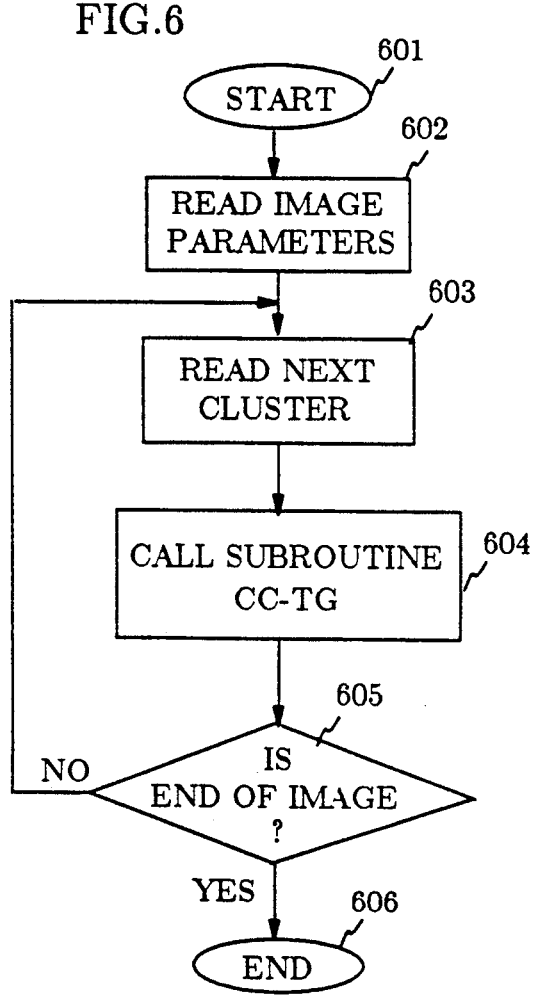
FIG. 6 illustrates a flow chart depicting the generic operation, in accordance with an aspect of the invention, of the decomposition processor implementation of FIG. 3.

FIG. 6 is a flow chart illustrating the generic operation of cluster classifier 302. The classification process is entered via start step 601. Thereafter, operational block 602 reads the image parameters, for example, the size of the image, i.e., the number of rows M and columns N to be obtained from image source 101 or from a prior one of decomposition processors 106, the number of clusters and the size, i.e., the configuration, of the cluster. Then, operational block 603 causes the next cluster of pixels to be read. As indicated above, the clusters could include pixels in any desired configuration. One advantageous configuration is one row of pixels in the low resolution replica which corresponds to two rows of high resolution pixels in the high resolution image. Operational block 604 calls subroutine CC-TG, shown in FIG. 7. As explained below, subroutine CC-TG classifies the particular cluster, causes the pixels to be appropriately encoded and generates the appropriate classification flag for the classified cluster. Conditional branch point 605 tests to determine if the image has been completed, i.e., if all the clusters have been read, classified and appropriately encoded. If the test result is NO, steps 603 through 605 are repeated until step 605 yields a YES result. Then, the process is ended via step 606.

Figure 7:
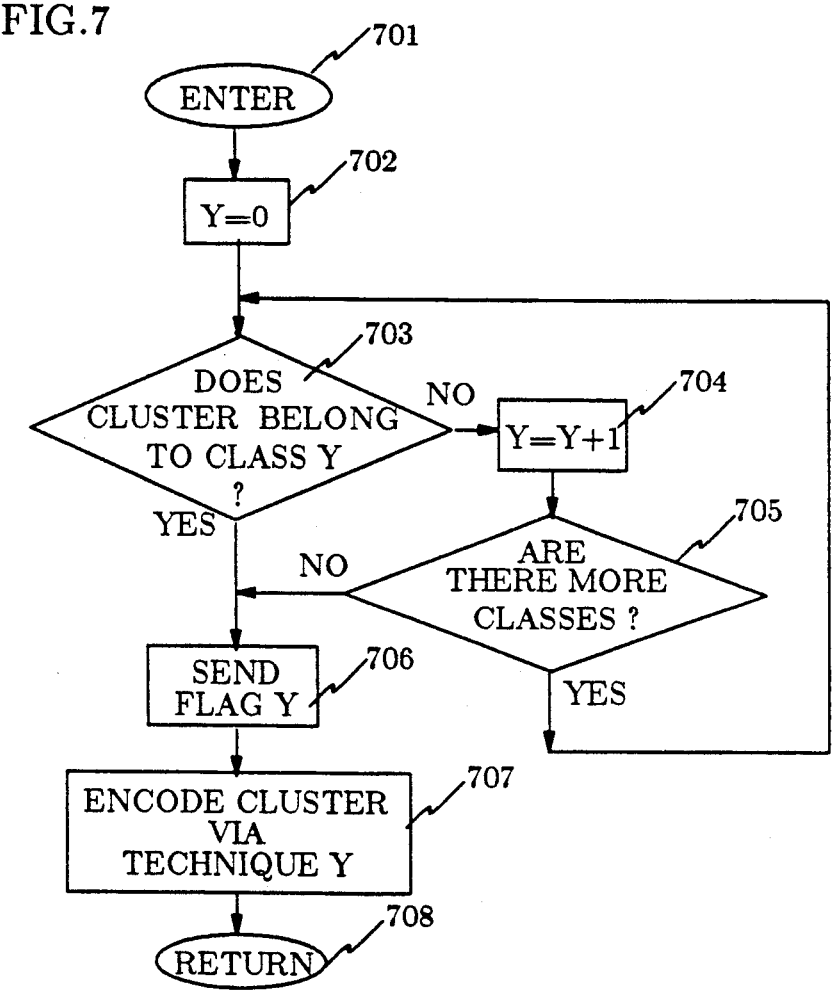
FIG. 7 is a flow chart of the generic subroutine CC-TG used in the operation of the decomposition processor illustrated in the flow chart of FIG. 6 which, in accordance with an aspect of the invention, classifies the clusters.

FIG. 7 is a flow chart illustrating subroutine CC-TG which is a generic classification and encoding process, in accordance with an aspect of the invention. Accordingly, the subroutine is entered via step 701. Then operational block 702 initializes the classification type index Y to Y=0. Conditional branch point 703 tests whether the current cluster is type Y. If the test result is NO, operational block 704 sets the classification index to Y=Y+1. Conditional branch point 705 tests to determine if there are any more classifications. If the test result is YES, steps 703 through 705 are repeated until either step 703 yields a YES result or step 705 yields a NO result. If the test result in step 703 is YES, the cluster is a classification Y type cluster and operational block 706 causes the classification flag for cluster type Y to be sent. If the test result in step 705 is NO, the cluster is a classification K+1 type cluster and step 706 causes the classification flag for cluster type K+1 to be sent. Where K+1 is the total number of possible cluster classifications. Operational block 707 causes the pixels of the cluster to be encoded via the appropriate technique assigned to the classification of the cluster. Thereafter, control is returned to the main routine of FIG. 6 via step 708.

Figure 8:
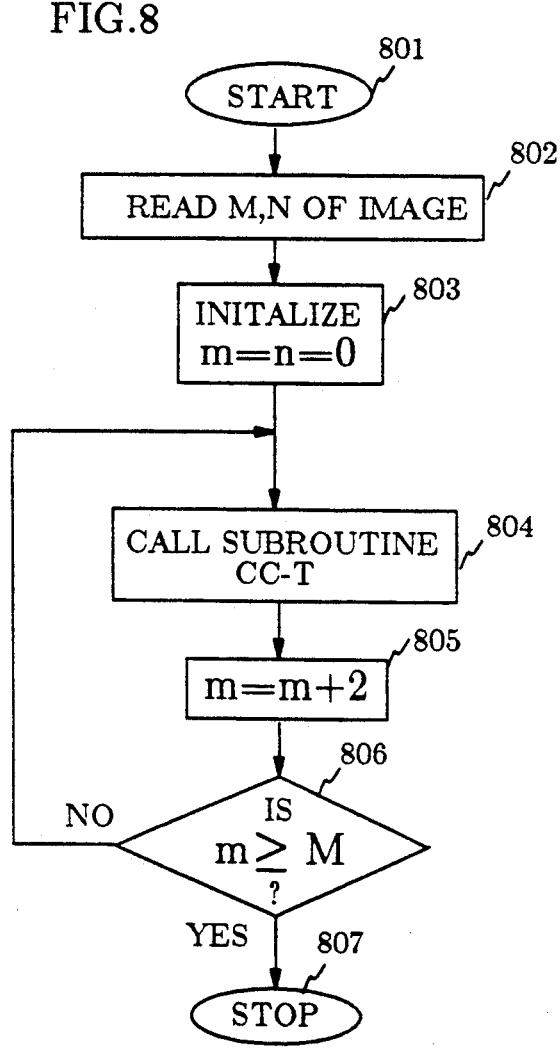
FIG. 8 is a flow chart illustrating operation, in accordance with an aspect of the invention, of the decomposition processor of FIG. 3.

FIG. 8 is a flow chart illustrating operation of decomposition processor 106-1 of FIG. 3 for an embodiment of the invention. The cluster configuration employed in this embodiment of the invention is one including high resolution pixels in two rows of the high resolution image and a corresponding single row in the low resolution replica being generated. Accordingly, the operational process in begun via start step 801. Then, operational block 802 reads the image parameters, i.e., the numbers of rows M and the number of columns N. Operational block 803 initializes the high resolution image row and column indices m and n, respectively, to be m=n=0. Operational block 804 causes subroutine CC-T to be called. Subroutine CC-T causes the particular clusters to be classified, the appropriate classification flag to be sent and the encoding of the pixels in the cluster according to the technique assigned to the cluster classification. Details of subroutine CC-T are described below. Operational block 805 causes the high resolution row index to be incremented by two rows, i.e., sets m=m+2. This follows, since the cluster includes two rows of pixels in the high resolution image. Then, conditional branch point 806 tests to determine if the image has been completed, i.e., if m≧M. If the test result is NO, the image has not been completed and steps 804 through 806 are repeated until step 806 yields a YES result. Then, the operational process is ended via step 807.

Figure 9:
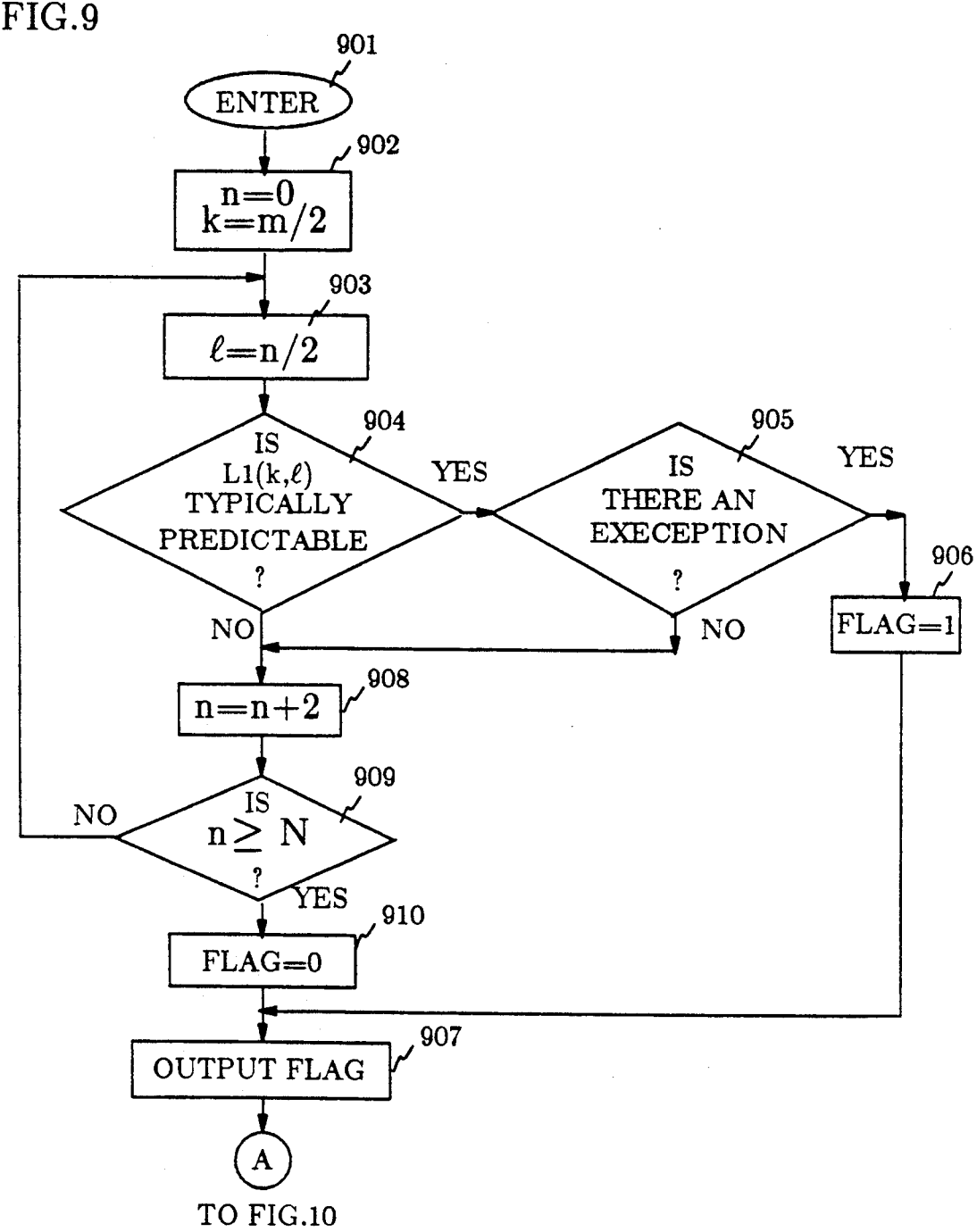
FIG. 9 and FIG. 10 when connected A—A form a flow chart of subroutine CC-T used in the operation of a first illustrative embodiment of the decomposition processor illustrated in the flow chart of FIG. 4 which, in accordance with an aspect of the invention, classifies clusters.
Figure 10:
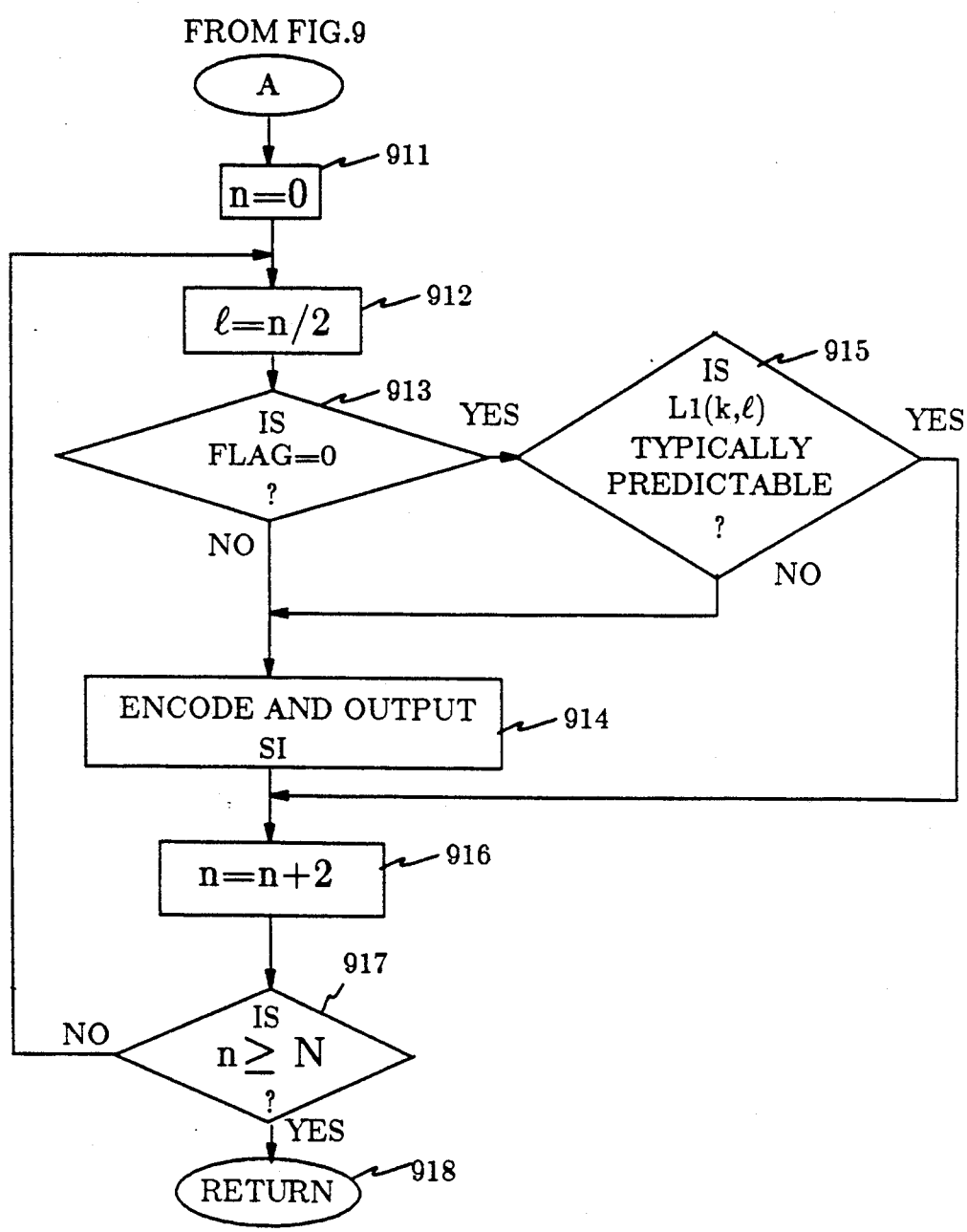

FIG. 9 and FIG. 10 when connected A—A form a flow chart of subroutine CC-T illustrating operation of one embodiment of the invention. In this embodiment, the clusters are being classified as either classification zero or classification one. Again, a cluster is classified as classification zero when all the pixels in the cluster are typically predictable with no exception and/or non-typically predictable. A cluster is classified as classification one when it includes at least one typically predictable pixel which is an exception to the general prediction rules described hereinbefore.

Accordingly, subroutine CC-T is entered via step 901. Then, operational block 902 initializes the high resolution image column index to be n=0 and the low resolution replica row index to be k=m/2. Operational block 903 sets the low resolution replica column index to be l=n/2. Conditional branch point 904 tests to determine if the current low resolution pixel L0(k,l) being processed is typically predictable in accordance with the general prediction rules described above. If the test result in step 904 is YES, the current low resolution pixel is typically predictable and conditional branch point 905 tests to determine if it is an exception to the general prediction rules. As described above, a typically predictable pixel is an exception, if the corresponding high resolution pixels cannot be properly recomposed by using the general prediction rules. If the test result in step 905 is YES, the pixel is an exception and, consequently, the cluster is classified as being classification 1. Thus, operational block 906 causes the classification flag for the current cluster to be FLAG=1 identifying the current cluster as being a classification one type. Operational block 907 causes the classification flag F1 to be sent as an output. Returning to step 904, if the test result is NO, the current low resolution pixel being processed is a non-typically predictable one and operational block 908 causes the column index in the high resolution image to be incremented by two, i.e., n=n+2. This follows because a low resolution pixel is derived from high resolution pixels in two columns and two rows of the high resolution image. Similarly, returning to step 905, if the test result is NO, the pixel is typically predictable and not an exception to the general prediction rules, as described above. Operational block 908 increments the high resolution image column index to be n=n+2, as described above. Then, conditional branch point 909 tests to determine if the cluster has been completed. If the test result in step 909 is NO, the cluster has not been completed and appropriate ones of steps 903, 904, 905, 908 and 909 are repeated until either step 905 or step 909 yields a YES result. Again, if step 905 yields a YES result, the cluster includes at least one typically predictable pixel which is an exception and step 906 causes the cluster to be classified as being classification one by generating FLAG=1. If step 909 yields a YES result, the cluster includes pixels that are typically predictable without an exception and/or pixels that are non-typically predictable and operational block 910 causes the cluster to be classified as being classification zero by generating FLAG=0. Thereafter, step 907 causes the FLAG to be sent as output F1. As described above steps 902 through 910 effect the classification of the individual clusters, in accordance with aspects of the invention.

The remainder of subroutine CC-T controls the encoding of the pixels, i.e., whether or not supplemental information needs to be encoded for the pixels. To this end, operational block 911 initializes the high resolution image column index to be n=0. Operational block 912 sets the low resolution replica column index to be l=n/2. Conditional branch point 913 tests to determine if the cluster has been classified as classification zero, i.e., is FLAG=0. If the test result in step 913 is NO, the cluster is a classification one type and operational block 914 causes the supplemental information (SI1) for the high resolution pixels in the super pixel corresponding to the current low resolution pixel being processed to be encoded, as described below. Returning to step 913, if the test result is YES, the cluster classification, in this example, is classification zero and conditional branch point 915 tests to determine if the current low resolution pixel is typically predictable. If the test result in step 915 is No, the pixel is non-typically predictable and step 914 causes the corresponding supplemental information (SI1) to be encoded, as described above. If the test result in step 915 is YES, the pixel is typically predictable and, consequently, supplemental information is not needed to be generated. Operational block 916 causes the high resolution column index to be incremented to n=n+2. Conditional branch point 917 tests to determine if the cluster which in this example includes pixels in a row, has been completed, i.e., if n≧N. If the test result is NO, appropriate ones of steps 912 through 917 are repeated until step 917 yields a YES result. Then, control is returned to the main routine of FIG. 8.

In this example, when supplemental information is needed to be encoded that supplemental information is representative of the colors of the high resolution pixels s1, s2, s3, and s4. Since it is assumed, in this example, that each high resolution pixel can be either black or white, there are sixteen possible combinations of colors for the high resolution pixels. The supplemental information (SI1) being generated for the current low resolution pixel is a binary number depending on the colors of the high resolution pixels s1, s2, s3 and s4. By way of an example, if s1 is white, s2 is black, s3 is white and s4 is black, the supplemental information to be encoded is SI1=0101 (binary).

Figure 11:
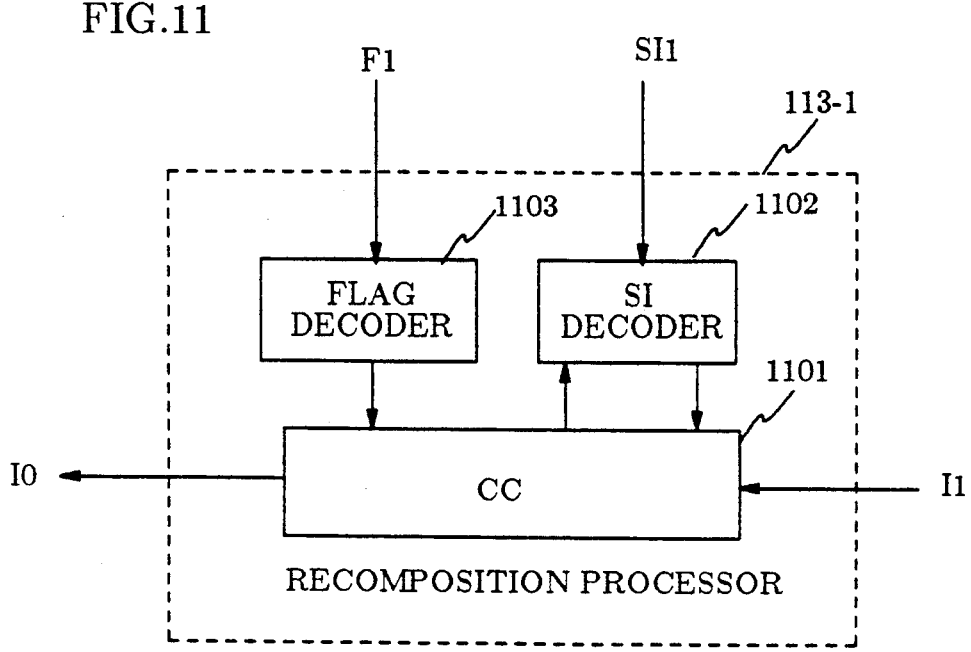
FIG. 11 shows, in simplified block diagram form, details of one of recomposition processors of FIG. 1.

FIG. 11 shows, in simplified block diagram form, details of recomposition processor 113-1. Since the operation and structure of each of recomposition processors 113-1 through 113-3 is identical, only recomposition processor 113-1 will be described in detail. Accordingly, recomposition processor 113-1 includes cluster classifier (CC) 1101, supplemental information (SI) decoder 1102 and flag decoder 1103. Low resolution pixels representative of low resolution replica I1 are, in this example, supplied to decomposition processor 113-1 from prior recomposition processor 113-2. If the particular one of recomposition processors 113 is the first or an only one in a series, the low resolution pixels are obtained from transmission network and/or storage unit 103 (FIG. 1) via DMUX 111 and decoder 112. Encoded supplemental information SI1 is supplied from DMUX 111 (FIG. 1) to SI decoder 1102 and encoded cluster flag F1 is also supplied from DMUX 111 to flag decoder 1103. SI decoder 1102 must be compatible with SI encoder 303 employed in decomposition processors 106. Similarly, flag decoder 1103 must be compatible with flag encoder 304 also used in decomposition processors 106. Preferably, decoders 1102 and 1103 are of the arithmetic type which are known in the art. One such arithmetic decoder is described in U.S. patent application Ser. No. 359,559, cited above.

CC 1101 is employed, in accordance with an aspect of the invention, to determine the classifications of the clusters and, in turn, which pixels in the classified clusters require supplemental information to properly recompose the high resolution pixels. It is noted that for certain cluster classifications supplemental information is required to recompose all of the pixels therein. To this end, decoded flag F1 is supplied from flag decoder 1103 and decoded supplemental information SI1 is supplied from SI decoder 1102 to cluster classifier 1101.

Operation of CC 1101, in accordance with an aspect of the invention, is described below. In this example, it is noted that all the low resolution pixels L1(k,l) for low resolution replica I1 are available and that all high resolution pixels h0(m,n) recomposed prior to the current high resolution pixel being recomposed are available.

Figure 12:
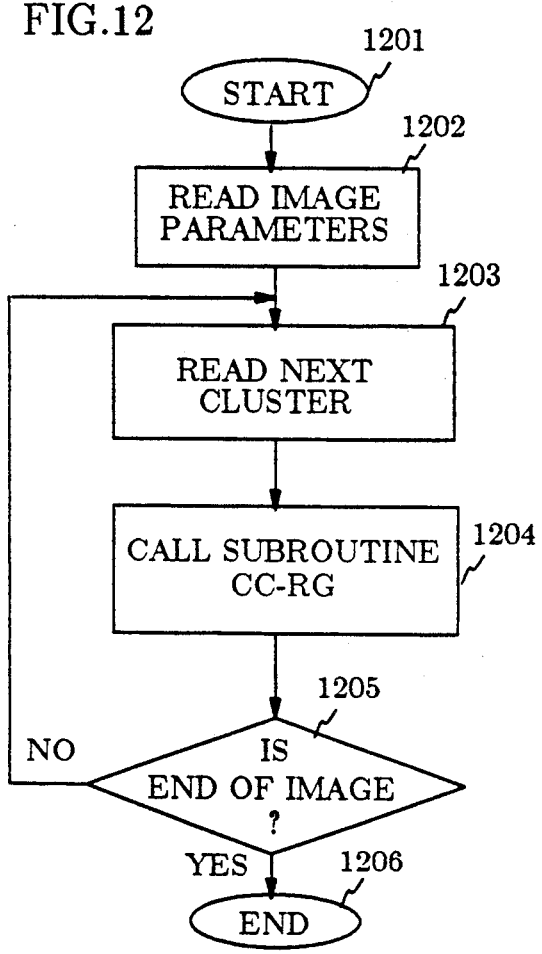
FIG. 12 illustrates a flow chart showing the generic operation, in accordance with aspects of the invention, of the the recomposition processor implementation of FIG. 11.

FIG. 12 is a flow chart of the generic operational steps of recomposer processor 113-1 of FIG. 1. Accordingly, the operation of CC 1101 is begun via start step 1201. Then, operational block 1202 obtains the parameters of the image to be recomposed, for example, the size of the image, i.e., the number of rows M and columns N of the high resolution image I0 being recomposed, which is to be obtained from a prior one of recomposition processors 113 or from decoder 103, the number of clusters in the image and the size, i.e., the configuration of the individual clusters. Operational block 1203 causes the next cluster of pixels to be read. Operational block 1204 causes subroutine CC-RG to be called. Subroutine CC-RG is a generic subroutine which determines the classification of the cluster and, accordingly, decodes the pixels in the cluster according to the classification.

Figure 13:
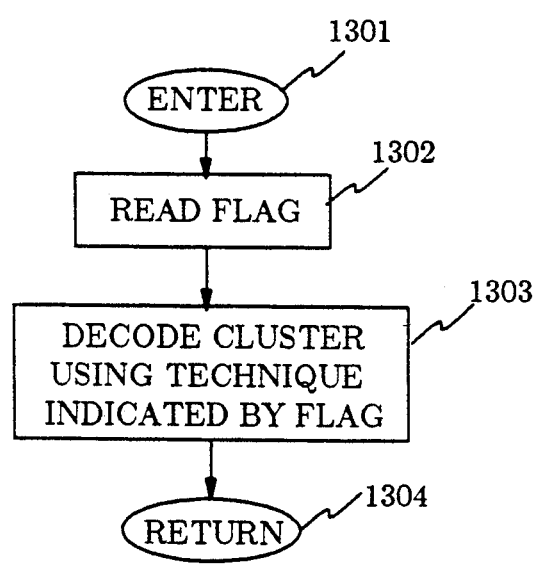
FIG. 13 is a flow chart of the generic subroutine CC-RG used in the operation of the recomposition processor shown in FIG. 11 which, in accordance with an aspect of the invention, recomposes pixels from the clusters.

Thus, referring to FIG. 13, there is shown a flow chart of subroutine CC-RG. The process is entered via step 1301. Then, operational block 1302 causes the flag associated with the cluster to be read. Operational block 1303 causes the pixels in the cluster to be recomposed, i.e., decoded according to the classification of the cluster. Thereafter, control is returned to the main routine of FIG. 12. Referring again to FIG. 12, conditional branch point 1205 tests to determine if the image has been completed. If the test result is NO, steps 1203 through 1205 are repeated until step 1205 yields a YES result. Then, the process is ended via step 1206.

FIG. 14 is a flow chart illustrating operation of recomposition processor 113-1 of FIG. 11 for an embodiment of the invention. The cluster configuration employed in this embodiment of the invention is one including high resolution pixels in two rows and two columns of the high resolution image and a single row and column of the corresponding low resolution replica. Accordingly, the process is begun via start step 1401. Thereafter, operational block 1402 reads the number of rows M and the number of columns N in the image. Operational block 1403 initializes the high resolution image row and column indices m and n, respectively, to be m=n=0. Operational block 1404 calls subroutine CC-R which is employed, in accordance with an aspect of the invention, to classify and decoded the clusters of pixels to recompose the high resolution image. Subroutine CC-R is described below. Operational block 1405 increments the row index of the high resolution image, namely setting m=m+2. Conditional branch point 1406 tests to determine if the image has been completed, namely, if m≧M. If the test result is NO, steps 1404 through 1406 are repeated until step 1406 yields a YES result. Then, the process is ended via step 1407.

FIG. 15 is a flow chart of subroutine CC-R illustrating the operation of one embodiment of the invention. Accordingly, the process is entered via step 1501. Then, operational block 1502 initializes the high resolution image column index to be n=0 and the low resolution replica row index to be k=m/2. Operational block 1503 causes the cluster flag to be read. Again, in this embodiment of the invention, classification FLAG=0 indicates that the pixels in the cluster are typically predictable without exception and/or non typically predictable and are to be decoded using the general prediction rules and the corresponding supplemental information for the typically non-predictable pixels, and classification FLAG=1 indicates that all pixels in the cluster are to be decoded using the corresponding supplemental information SI1. Operational block 1504 sets the low resolution replica column index to be l=n/2. Conditional branch point 1505 tests to determine if the cluster FLAG=0. If the test result in step 1505 is NO, the cluster is a classification one type and operational block 1506 causes the supplemental information for the pixel to be decoded. That is, the color for high resolution pixels s1, s2, s3 and s4 for the pixel is obtained. If the test result in step 1505 is YES, the cluster is of classification type zero since FLAG=0 and the pixels therein are either typically predictable with no exception or non-typically predictable. Conditional branch point 1507 tests to determine if the current low resolution pixel being processed is typically predictable (as described above in relation to step 915 of FIG. 10). If the test result in step 1507 is NO, the pixel is non-typically predictable and step 1506 causes the supplemental information for the pixel to be decoded, as described above. If the test result in step 1507 is YES, the pixel is typically predictable and it is decoded in accordance with the general predict rules, in this example, the color of each of s1, s2, s3, and s4 is set equal to the color of the current low resolution pixel L1(k,l). Operational block 1509 sets the high resolution column index to be n=n+2. Conditional branch point 1510 tests to determine if the cluster has been completed, namely, if n≧N. If the test result is NO, the cluster has not been completed and appropriate ones of steps 1504 through 1510 are repeated until step 1510 yields a YES result. Then, control is returned to the main routine of FIG. 14 via step 1511.

We claim:

1. A method for encoding pixels in decomposing a high resolution image into a low resolution replica and supplemental information, for transmission or storage, comprising the steps of:
   a. obtaining a cluster including a plurality of pixels in a prescribed configuration;
   b. determining if said cluster of pixels has a prescribed predictability classification in accordance with prescribed classification criteria;
   c. generating a cluster predictability classification indication in accordance with said classification determination, said predictability classification indication being indicative of whether pixels to be recomposed are non-typically predictable, typically predictable and not an exception or typically predictable and an exception;
   d. encoding pixel information in said cluster in accordance with prescribed encoding criteria assigned to said cluster predictability classification; and
   e. supplying as outputs said encoded pixel information for said cluster and said cluster classification.

2. The method as defined in claim 1 further including the steps of:
   f. obtaining a next cluster including a plurality of pixels in said prescribed configuration as in step (a);

g. repeating steps (b) through (f) until all clusters in an image being decomposed have been processed.

3. The method as defined in claim 2 further including the step of interfacing said outputs to a transmission network or storage in a to unit.

4. A method for encoding pixels in decomposing a high resolution image into a low resolution pixel and supplemental information comprising the steps of:
   a. obtaining a plurality of low resolution pixels from said low resolution replica in a prescribed cluster configuration;
   b. obtaining a plurality of high resolution pixels from said high resolution image in prescribed relationship to said low resolution pixels in said cluster;
   c. obtaining a group of pixels in a prescribed relationship to a current low resolution pixel from said cluster;
   d. utilizing pixels in said group and prescribed ones of said obtained high resolution pixels for determining in accordance with prescribed prediction criteria if one or more high resolution pixels to be recomposed for said current low resolution pixel are non-typically predictable, typically predictable and not an exception or typically predictable and an exception;
   e. classifying said cluster as being a first classification if the high resolution pixels being recomposed for said current low resolution pixel are determined to be typically predictable and an exception, generating a classification indicator representation of said first classification, and generating supplemental information for all of said low resolution pixels in said cluster;
   f. generating supplemental information for said current low resolution pixel if said one or more high resolution pixels to be recomposed for it are determined to be non-typically predictable;
   g. obtaining a next prescribed group of pixels in prescribed relationship to a next current low resolution pixel in said cluster as in step (c);
   h. repeating steps (d) through (g) until either all of said high resolution pixels in said cluster have been determined to be non-typically predictable and/or typically predictable and not an exception, or at least one high resolution pixel in said cluster has been determined to be typically predictable and an exception;
   i. classifying said cluster as being a second classification if none of said high resolution pixels in said cluster is determined to be typically predictable and an exception, generating a classification indication representative of said second classification and generating supplemental information for said one or more high resolution pixels in said cluster determined to be non-typically predictable;
   j. supplying as an output said classification indication, and said supplemental information, if any.

5. The method as defined in claim 4 further including the steps of:
   k. obtaining a plurality of low resolution pixels from said low resolution replica forming a next prescribed cluster; and
   l. repeating steps (b) through (k) until all clusters in said low resolution replica have been processed.

6. The method as defined in claim 5 further including the step of interfacing said output for transmission or storage.

7. The method as defined in claim 5 wherein said step of utilizing includes the steps of;
   m. determining that said one or more high resolution pixels to be recomposed from said current low resolution pixel are typically predictable and not exceptions if the color of each low resolution pixel in said group and the color of each of said high resolution pixels are the same as the color of said current low resolution pixel;
   n. determining that said one or more high resolution pixels to be recomposed for said current low resolution pixel are typically predictable and exceptions, if all of said low resolution pixels in said group have the same color as said current low resolution pixel and at least one of said high resolution pixels in said plurality has a color not the same as said current low resolution pixel;
   o. determining that said one or more high resolution pixels being recomposed for said current low resolution pixel are non-typically predictable if any one of said low resolution pixels in said group has a color different from said current low resolution pixel.

8. The method as defined in claim 7 wherein said low resolution replica has a plurality of columns and a plurality of rows forming low resolution pixels and wherein each of said clusters includes low resolution pixels in a row and wherein said group of low resolution pixels includes low resolution pixels in the neighborhood of said current low resolution pixel in the low resolution replica.

9. The method as defined in claim 8 wherein said group includes low resolution pixels surrounding said current-low resolution pixel in the low resolution pixel and said plurality of high resolution pixels includes at least a super fixed of high resolution pixels corresponding to send. arrived said low resolution pixel.

10. A method for decoding pixels in recomposing a high resolution image from a basic low resolution replica and supplemental information from transmission or storage, comprising the steps of:
   a. obtaining a predictability classification indication for a cluster including a plurality of pixels in a prescribed configuration, said predictability classification indication being indicative of whether pixels to be recomposed are non-typically predictable, typically predictable and not an exception or typically predictable and an exception;
   b. determining a predictability classification of said cluster from said classification indication;
   c. decoding pixel information for each pixel in said cluster in accordance with prescribed decoding criteria assigned to said cluster classification; and
   d. supplying said decoded pixel information as an output.

11. A method as defined in claim 10 further including the steps of:
   f. obtaining a next cluster predictability classification indication for a next cluster;
   g. repeating steps (b) through (f) until all clusters for an image being recomposed have been processed.

12. The method as defined in claim 11 further including the step of supplying decoded pixel information to an image output unit.

13. A method for decoding pixels in recomposing a high resolution image from a basic low resolution replica and supplemental information, comprising the steps of:

a. obtaining a cluster including a plurality of low resolution pixels in a prescribed configuration;
b. obtaining a classification indication for said obtained cluster;
c. obtaining a current low resolution pixel from said cluster to be processed;
d. obtaining supplemental information for said current low resolution pixel, if any;
e. determining the classification of said cluster from said classification indication;
f. if said cluster is of a first classification, using said supplemental information to output said high resolution pixels being recomposed for said current low resolution pixel;
g. if said cluster is of a second classification, determining if, one or more high resolution pixels being recomposed for said current low resolution pixel is typically predictable;
h. if the result in step (g) is NO, using said supplement information to output said high resolution pixels being recomposed for said current low resolution pixel;
i. if the result in step (g) is YES, supplying in accordance with prescribed criteria an output for said high resolution pixels being recomposed for said current low resolution pixel;
j. repeating steps (c) through (i) until all of said low resolution pixels in said cluster have been processed;
k. obtaining a next cluster including said plurality of low resolution pixels in said prescribed configuration as in step (a); and
l. repeating steps (b) through (k) until all of said clusters in the low resolution replica have been processed.

14. The method as defined in claim 13 wherein said prescribed criteria includes supplying as an output high resolution pixels having the same color as said current low resolution pixel.

15. The method as defined in claim 14 further including the step of interfacing a transmission network or storage unit to obtain said low resolution pixels, said classification indications and said supplemental 16. Apparatus for encoding pixels in decomposing a high resolution image into a low resolution replica and supplemental information for transmission or storage, comprising:
a source of high resolution pixels representative of a high resolution image;
means for generating low resolution pixels from said high resolution pixels to obtain said low resolution replica;
means for obtaining a plurality of low resolution pixels from said low resolution replica in a prescribed cluster configuration;
means for obtaining a plurality of high resolution pixels from said high resolution image in prescribed relationship to said low resolution pixels in said cluster;
means for obtaining a group of pixels in a prescribed relationship to a current low resolution pixel from said cluster;
means for utilizing said pixels in said group and prescribed ones of said obtained high resolution pixels for determining in accordance with prescribed prediction criteria if one or more high resolution pixels to be recomposed for said current low resolution pixel are non-typically predictable, typically predictable and not an exception or typically predictable and an exception;
means for classifying said cluster as being a first classification if the high resolution pixels being recomposed for said current low resolution pixel are determined to be typically predictable and an exception, generating a classification indicator representation of said first classification, and, generating supplemental information for all high resolution pixels corresponding to said low resolution pixels in said cluster;
means for generating supplemental information for said current low resolution pixel if said one or more high resolution pixels to be recomposed for it are determined to be non-typically predictable;
classifying said cluster as being a second classification if none of said high resolution pixels being recomposed for said low resolution pixels in said cluster is determined to be typically predictable and an exception, generating a classification indication representative of said second classification and generating supplemental information for said one or more high resolution pixels to be recomposed for said low resolution pixel in said cluster determined to be non-typically predictable; and
means for supplying as an output said classification indication, and said supplemental information, if any.

17. Apparatus as defined in claim 16 further including means for interfacing said output for transmission or storage.

18. Apparatus for decoding pixels in recomposing a high resolution image from a low resolution replica and supplemental information from transmission or storage, comprising:
means for obtaining a plurality of low resolution pixels in a prescribed cluster configuration;
means for obtaining a classification indication for said obtained cluster;
means for obtaining a current low resolution pixel to be processed;
means for obtaining supplemental information for said low resolution pixels;
means for determining a classification of said cluster;
means responsive to a first classification determination for using said supplemental information to output said high resolution pixels corresponding to said current low resolution pixel and to a second classification determination for determining if high resolution pixels being recomposed for said current low resolution pixel are typically predictable;
means for supplying as an output representations of said high resolution pixels being recomposed in accordance with prescribed criteria if said current low resolution pixel is in a cluster of said second classification and is typically predictable and for supplying as an output high resolution pixels determined from said supplemental information if said current low resolution pixel is in a cluster of said second classification and non-typically predictable.

19. Apparatus for encoding pixels in progressively decomposing a high resolution image into a basic low resolution replica and supplemental information, for transmission or storage, comprising:
a source of high resolution pixels representative of a high resolution image;
a plurality of decomposition processor means connected in series, a first one of said decomposition processor means in said series being supplied with high resolution pixels from said source and a last one of said decomposition processor means in said series supplying as an output basic low resolution pixels representative of a basic low resolution replica, individual ones of said decomposition processor means other than said first one, obtaining high resolution pixels from a prior one of said decomposition processor means in said series, that is, the low resolution pixel output from a prior one of said decomposition processor means is a high resolution pixel input to the next one of said decomposition processor means in said series, each of said decomposition processor means including means for generating low resolution pixels from said supplied high resolution pixels to obtain a low resolution replica, means for obtaining a plurality of low resolution pixels from said low resolution replica in a prescribed cluster configuration, means for obtaining a plurality of high resolution pixels from said high resolution image in prescribed relationship to said low resolution pixels in said cluster, means for obtaining a group of pixels in a prescribed relationship to a current low resolution pixel from said cluster, means for utilizing said pixels in said group and prescribed ones of said obtained high resolution pixels for determining in accordance with prescribed prediction criteria if one or more high resolution pixels to be recomposed for said current low resolution pixel are non-typically predictable, typically predictable and not an exception or typically predictable and an exception, means for classifying said cluster as being a first classification if the high resolution pixels being recomposed for said current low resolution pixel are determined to by typically predictable and an exception, generating a classification indicator representation of said first classification, and generating supplemental information for all of said low resolution pixels in said cluster, means for generating supplemental information for said current low resolution pixel if said one or more high resolution pixels to be recomposed for it are determined to be non-typically predictable, means for classifying said cluster as being a second classification if none of said high resolution pixels being recomposed for said low resolution pixels in said cluster is determined to be typically predictable and an exception, generating a classification indication representative of said second classification and generating supplemental information for said one or more high resolution pixels to be recomposed for said low resolution pixel in said cluster determined to be non-typically predictable and means for supplying as an output said classification indication, and said supplemental information, if any; and means for supplying as an output representations of said cluster classification indications from each of said decomposition processor means, representations of said supplemental information from each of said decomposition processor means and said basic low resolution pixels as an output for transmission or storage.

20. Apparatus as defined in claim 19 further including means for combining said respresentations and means for interfacing said combined representations to a transmission network or storage unit.

21. Apparatus for decoding pixels in progressively recomposing a high resolution image from a basic low resolution replica and supplemental information from transmission or storage, comprising:

means for supplying basic low resolution pixels representative of the basic low resolution image, representations of exception indications and representations of supplemental information from transmission or storage;

a plurality of recomposition processor means connected in series, a first one of said decomposition processor means in said series being supplied with said basic low resolution pixels and a last one of said decomposition processor means in said series supplying as an output high resolution pixels of said high resolution image, individual ones of said recomposition processor means other than said first one obtaining low resolution pixels from a prior one of said recomposition processor means in said series, that is, the high resolution pixel output from a prior one of said recomposition processor means in said series is the low resolution pixel input to the next one of said recomposition processor means in said series, each of said recomposition processors including, means for obtaining a plurality of low resolution pixels in a prescribed cluster configuration, means for obtaining a classification indication for said obtained cluster, means for obtaining a current low resolution pixel to be processed, means for obtaining supplemental information for said low resolution pixels, means for determining a classification of said cluster, means responsive to a first classification determination for suppying as an output high resolution pixels determined from said supplemental information and to a second classification determination for determining if high resolution pixels being recomposed for said current low resolution pixel are typically predictable, means for supplying as an output representations of said high resolution pixels being recomposed in accordance with prescribed criteria if said current low resolution pixel is in a cluster of said second classification and is typically predictable and for using said supplemental information to output said high resolution pixels if said current low resolution pixel is in a cluster of said second classification and non-typically predictable and means for supplying representations of high resolution pixels from each of said plurality of recomposition processors as an output.

22. Apparatus as defined in claim 21 wherein said prescribed criteria includes supplying as an output colors for said high resolution pixels being recomposed which are the same as said current low resolution pixel.

23. Apparatus as defined in claim 22 further including means for interfacing to a transmission network or storage unit to obtain said basic low resolution pixels, said classification indications and said supplemental information.

* * * * *

UNITED STATES PATENT AND TRADEMARK OFFICE
CERTIFICATE OF CORRECTION

PATENT NO. : 5,031,053
DATED : July 9, 1991
INVENTOR(S) : Christodoulos Chamzas et al.

It is certified that error appears in the above-identified patent and that said Letters Patent is hereby corrected as shown below:

ON THE TITLE PAGE:

Item (75) Inventors "West Long Beach" should read
--West Long Branch--.

Column 18, line 2 "respresentations" should read
--representations--.

Signed and Sealed this

Thirty-first Day of August, 1993

Attest:

BRUCE LEHMAN

*Attesting Officer*     *Commissioner of Patents and Trademarks*